(12) United States Patent
Boegner et al.

(10) Patent No.: US 6,637,189 B1
(45) Date of Patent: Oct. 28, 2003

(54) METHOD FOR THE PERIODICALLY DESULFATING A NITROGEN OXIDE OR SULFUR OXIDE ACCUMULATOR OF AN EXHAUST GAS CLEANING SYSTEM

(75) Inventors: Walter Boegner, Remseck (DE); Guenter Karl, Esslingen (DE); Bernd Krutzsch, Denkendorf (DE); Stefan Renfftlen, Eislingen (DE); Christof Schoen, Remshalden (DE); Dirk Voigtlaender, Korntal-Muenchingen (DE); Guenter Wenninger, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/743,983

(22) PCT Filed: Mar. 22, 2000

(86) PCT No.: PCT/EP00/02518

§ 371 (c)(1),
(2), (4) Date: Mar. 20, 2001

(87) PCT Pub. No.: WO00/71864

PCT Pub. Date: Nov. 30, 2000

(30) Foreign Application Priority Data

May 19, 1999 (DE) .......................................... 199 22 962

(51) Int. Cl.$^7$ ................................................. F01N 3/00
(52) U.S. Cl. ........................... 60/274; 60/276; 60/285; 60/286; 60/289; 60/297
(58) Field of Search .................... 60/274, 276, 285, 60/286, 289, 290, 295, 297

(56) References Cited

U.S. PATENT DOCUMENTS

| | | | | |
|---|---|---|---|---|
| 5,832,722 A | * | 11/1998 | Cullen et al. .................. | 60/274 |
| 5,974,788 A | * | 11/1999 | Hepburn et al. ............... | 60/274 |
| 5,974,791 A | * | 11/1999 | Hirota et al. .................. | 60/276 |
| 6,161,377 A | * | 12/2000 | Boegner et al. ............... | 60/274 |
| 6,293,094 B1 | * | 9/2001 | Schmidt et al. ............... | 60/284 |
| 6,318,075 B1 | * | 11/2001 | Gunther et al. ............... | 60/285 |

FOREIGN PATENT DOCUMENTS

| | | |
|---|---|---|
| DE | 197 47 222 | 3/1999 |
| DE | 198 30 829 | 4/1999 |
| EP | 0 860 595 | 8/1998 |
| WO | WO 98/27322 | 6/1998 |

* cited by examiner

*Primary Examiner*—Thomas Denion
*Assistant Examiner*—Binh Tran
(74) *Attorney, Agent, or Firm*—Crowell & Moring LLP

(57) ABSTRACT

In a method for the periodic desulphurization of a nitrogen-oxide or sulphur-oxide accumulator of an exhaust-gas cleaning system of an internal-combustion engine, during respective desulphurization periods, the accumulator is fed secondary air by secondary-air supply means, and is fed an engine exhaust gas which contains a reducing agent by setting a rich engine air ratio. At least during part of the desulphurization period, after a predeterminable desulphurization temperature has been reached, the accumulator air ratio is set, by suitably alternating the secondary air quantity supplied and/or the engine air ratio, between an oxidizing or stoichiometric atmosphere, and a reducing atmosphere.

8 Claims, 1 Drawing Sheet

METHOD FOR THE PERIODICALLY DESULFATING A NITROGEN OXIDE OR SULFUR OXIDE ACCUMULATOR OF AN EXHAUST GAS CLEANING SYSTEM

BACKGROUND AND SUMMARY OF THE INVENTION

This application claims the priority of German patent document 199 22 962.7, filed May 19, 1999, and PCT International Application No. PCT/EP00/02518, filed Mar. 22, 2000, the disclosures of which is expressly incorporated by reference herein.

The invention relates to a method for the periodic desulphurization of a nitrogen-oxide or sulphur-oxide accumulator of an exhaust-gas cleaning system of a combustion machine, such as an internal combustion engine.

Exhaust-gas cleaning systems having a nitrogen-oxide ($NO_x$) accumulator, such as an $NO_x$ adsorber catalytic converter, and optionally a sulphur-oxide ($SO_x$) accumulator, such as a so-called $SO_x$ trap, connected upstream of the nitrogen-oxide accumulator, are used in particular in motor vehicles in order to minimize the nitrogen oxide emissions from the motor vehicle internal-combustion engine. For this purpose, it is known, in engine operating phases in which high levels of nitrogen oxide are formed, such as in lean-burn mode, for nitrogen oxide to be temporarily stored in the $NO_x$ accumulator, for example by an adsorption process, so that it can be released again and converted in a suitable subsequent operating phase, for example by means of a corresponding desorption process and subsequent reduction to form nitrogen in a rich-burn mode. In this context, the terms lean-burn and rich-burn mode are to be understood as meaning, as is customary, an engine operating phase involving a lean or rich engine air ratio, i.e., an air/fuel ratio of the air/fuel mixture which is burnt in the engine lying above or below the stoichiometric value, respectively.

One known difficulty of such systems is that, particularly in lean-burn mode of the engine, the exhaust gas contains sulphur dioxide on account of sulphur which is contained in standard fuels and engine oils. This sulphur dioxide may lead to sulphur poisoning of the $NO_x$ accumulator as a result of sulphate formation, which reduces the $NO_x$ storage capacity of the accumulator. Therefore, it is known to subject the $NO_x$ accumulator to a desulphurization operation whenever a significant drop in its $NO_x$ storage capacity is observed, in order to remove sulphate deposits therefrom. Alternatively, an $SO_x$ trap is connected upstream of the $NO_x$ accumulator, and is then periodically desulphurized in a similar way.

To effectively desulphurize the nitrogen-oxide or sulphur-oxide accumulator, it is known to set elevated exhaust-gas temperatures (for example, over 600_C) and a rich accumulator air ratio (i.e., a ratio which is below the stoichiometric level). The term accumulator air ratio is understood to mean the ratio of oxygen or air to fuel or unburnt hydrocarbons in the exhaust gas which is fed to the accumulator. Setting such conditions is described, for example, in W. Strehlau et al., New Developments in Lean $NO_x$ Catalysts for Gasoline Fueled Passenger Cars in Europe, SAE 96 2047, 1996.

In European patent document EP 0 636 770 A1, it is proposed, in order to desulphurize an $NO_x$ adsorber catalytic converter, to switch the internal-combustion engine from a lean engine air ratio to a rich engine air ratio and, if necessary, also to activate an electric heater device associated with the $NO_x$ adsorber. The desulphurization phase is maintained each time for a specific period of approximately 10 minutes.

Various methods of the type mentioned in the introduction have also been proposed for carrying out the desulphurization. In these methods, a rich engine mode is combined with a supply of secondary air to the nitrogen-oxide or sulphur-oxide accumulator. In a method of this type which is disclosed in German patent document DE 195 22 165 A1, in addition to other types of procedures, this is achieved by regulating the temperature of the $NO_x$ accumulator catalytic converter by suitably setting the engine air ratio and the secondary air quantity in combination with a delayed adjustment of the ignition time to a desired, increased desired value. In a method which is described in the older German patent document 197 47 220.2, the engine air ratio and the secondary air feed rate are set at least as a function of the output signal from a lambda probe arranged downstream of an $NO_x$ accumulator catalytic converter which is to be desulphurized, i.e. as a function of the accumulator air ratio. In a further method, which is described in the older German patent document 198 02 631.5, an $SO_x$ trap connected upstream of an $NO_x$ adsorber catalytic converter is periodically desulphurized with a secondary air supply and a rich engine mode. The $SO_x$ accumulator air ratio and the $SO_x$ accumulator temperature are held at predetermined desired values, in particular by suitably varying the secondary air quantity supplied and/or the engine air ratio.

One object of the invention is to provide a method of the type described above, which is particularly effective for desulphurizing a nitrogen-oxide or sulphur-oxide accumulator of an exhaust-gas cleaning system of an internal-combustion engine, by secondary air supply and setting a rich engine air ratio.

This and other objects and advantages are achieved by the method according to the invention, in which after a predeterminable desulphurization temperature has been reached, at least during part of the subsequent desulphurization period, the accumulator air ratio (that is, the oxygen/reducing agent ratio) of the exhaust-gas atmosphere in the $NO_x$ or $SO_x$ accumulator which is to be desulphurized is set, by suitably changing the secondary air quantity supplied and/or the engine air ratio, (i.e., the air/fuel ratio of the air/fuel mixture which is burnt in the internal-combustion engine), to oscillate between an oxidizing atmosphere and a reducing atmosphere.

This procedure makes use of the discovery that in a reducing atmosphere (i.e., with a rich accumulator air ratio), sulphates present in the nitrogen-oxide or sulphur-oxide accumulator are broken down to form sulfides. The latter cover a catalytically active precious metal material which is usually present in the accumulator body and may lead to a reduced catalytic activity thereof, making further sulphate decomposition more difficult and slower. The inventive insertion of desulphurization phases with at least a stoichiometric, and preferably lean, accumulator air ratio (i.e., a stoichiometric or oxidizing atmosphere), allows the sulfides formed to be broken down so as to release sulphur dioxide ($SO_2$); thereafter, in a subsequent reducing phase of the desulphurization operation, the sulphate decomposition can be continued effectively again. The alternating change in the accumulator air ratio from rich to stoichiometric or lean and vice versa is achieved by suitably changing the quantity of secondary air and therefore oxygen supplied, and/or by changing the engine air ratio and therefore the reducing agent quantity. The oscillating modulation of the accumulator air ratio is preferably maintained until most of the accumulated sulphates have been broken down and desorbed, so that the $NO_x$ or $SO_x$ storage capacity of the nitrogen-oxide or sulphur-oxide accumulator is once again sufficiently high.

In one embodiment of the invention, the amplitude and/or frequency of the oscillating accumulator air ratio can be set variably according to operating conditions, so that in the corresponding operating situation the desulphurization of the nitrogen-oxide or sulphur-oxide accumulator is as rapid as possible.

In a second embodiment of the invention, the accumulator air ratio is regulated in an oscillating manner between an oxidizing or stoichiometric atmosphere and a reducing atmosphere (i.e., is regulated to a correspondingly oscillating desired value), the actual value being recorded by means of a lambda probe which is positioned suitably upstream or downstream of the nitrogen-oxide or sulphur-oxide accumulator.

In still another embodiment, at the start of the desulphurization process until a predeterminable desulphurization temperature is reached, the accumulator air ratio is kept constantly at least slightly in the rich range by suitably setting a rich engine air ratio despite the secondary air feed having been activated, so that by oxidation of reducing agent the accumulator can be brought to the desired desulphurization temperature relatively quickly.

Other objects, advantages and novel features of the present invention will become apparent from the following detailed description of the invention when considered in conjunction with the accompanying drawings.

BRIEF DESCRIPTION OF THE DRAWINGS

The figure shows three diagrams which are positioned one above the other so as to be synchronous, illustrating the temporal profile of the engine air ratio, the supplied secondary air quantity and the accumulator air ratio during a desulphurization process.

DETAILED DESCRIPTION OF THE DRAWINGS

Figure 1A:
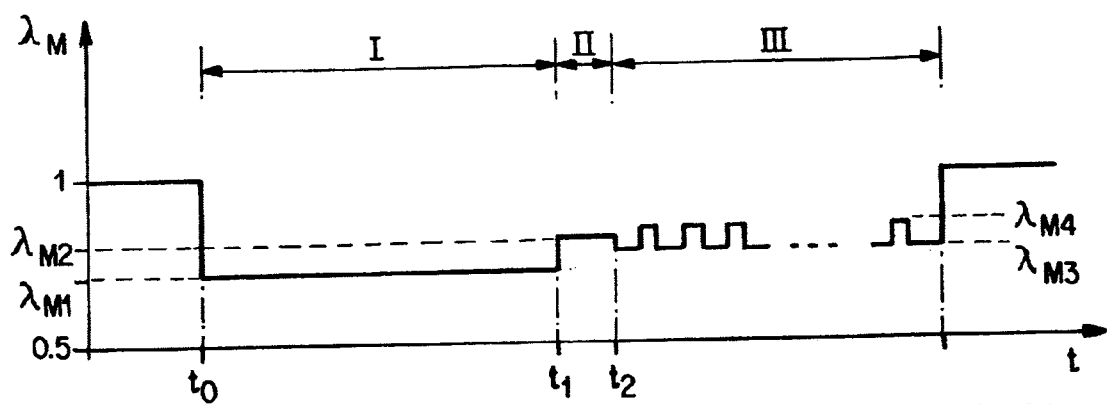
Figure 1B:
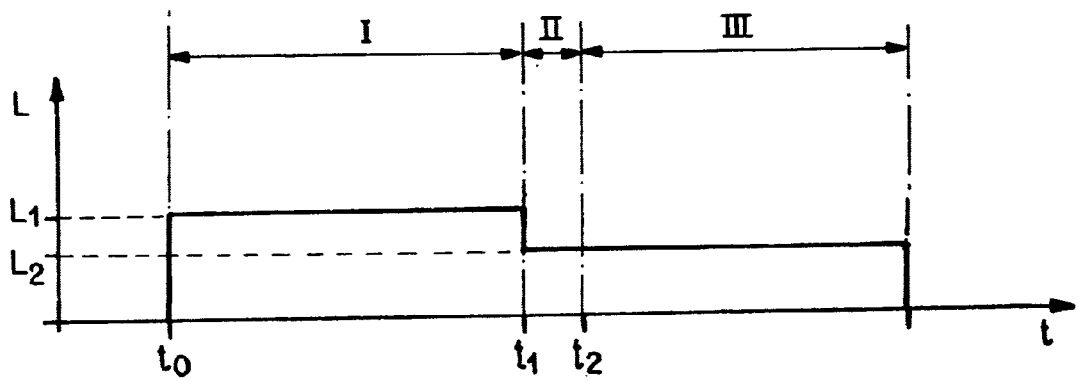
Figure 1C:
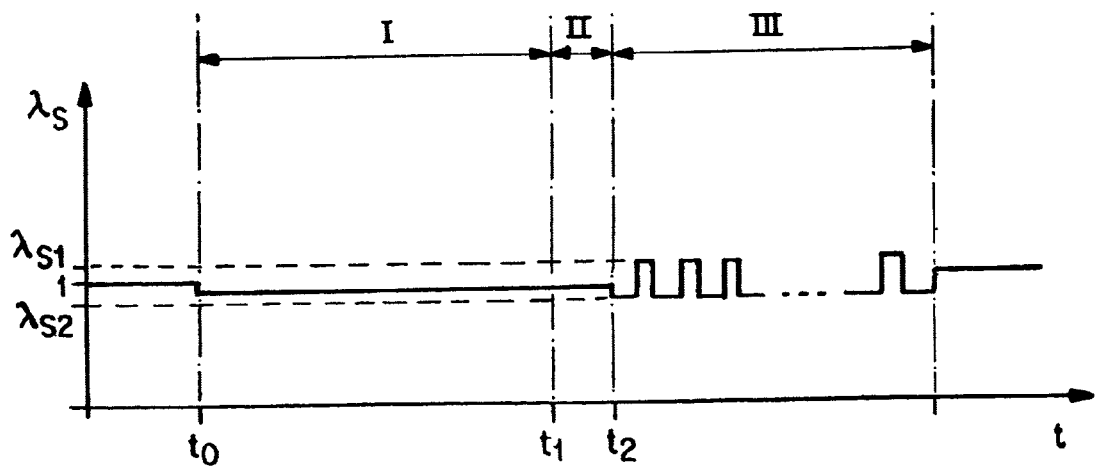

The desulphurization process which is illustrated in the figure on the basis of associated diagrams is used, by periodic application of this process, to repeatedly desulphurize a nitrogen-oxide or sulphur-oxide accumulator of an exhaust-gas cleaning system of an internal-combustion engine, for example in a motor vehicle. The accumulator may in particular be an $NO_x$ adsorber or an $SO_x$ trap. The desulphurization process is carried out whenever the $NO_x$ storage capacity of the nitrogen-oxide accumulator or the $SO_x$ storage capacity of the $SO_x$ trap drops noticeably. By means of the desulphurization process, deposited sulphur, which is usually in sulphate form, is cleaned off the corresponding accumulator, which as a result is restored as far as possible to its initial $NO_x$ or $SO_x$ storage capacity.

The desulphurization process shown comprises three successive phases. A first desulphurization phase I is used to bring the accumulator to an elevated temperature, which is desirable for desulphurization, as quickly as possible this temperature being higher than in the previous operating phase, in which the accumulator performs its normal $NO_x$ or $SO_x$ storage function. For this purpose, at starting time to of the desulphurization process, the supply of secondary air to the $NO_x$ or $SO_x$ accumulator is commenced, at a predeterminable feed rate L, as shown in the middle diagram illustrating the secondary air feed rate L as a function of time t. At the same time, the engine air ratio $1_M$, i.e., the air/fuel ratio of the air/fuel mixture which is burnt in the engine, is set to a value $1_{M1}$ which lies in the rich range, having previously been, for example, at the stoichiometric level one, as illustrated in the top diagram illustrating the temporal profile of the engine air ratio $1_M$ in the figure.

During the first desulphurization phase I, the engine air ratio _M and the secondary air feed rate L are adapted to one another in such a way that the resultant accumulator air ratio _s, i.e., oxygen/reducing agent ratio of the engine exhaust gas which has been enriched with the secondary air supplied and has been fed to the accumulator which is to be desulphurized, is kept in the rich range, preferably at between 0.70 and 0.99. In the example shown in the bottom diagram in the figure, illustrating the temporal profile of the accumulator air ratio _s, the latter is slightly in the rich range, i.e., lies slightly below the stoichiometric value of one. The reducing agents which are contained in the engine exhaust gas on account of the rich-burn engine mode, such as unburnt hydrocarbons, etc., burn in the $NO_x$ or $SO_x$ accumulator together with the oxygen contained in the secondary air supplied and, as a result, allow rapid heating of the accumulator. In addition (or as an alternative) to this measure, it is possible to provide other types of accumulator heating means, for example an electric heater device.

Therefore, as soon as the desired desulphurization temperature has been reached in one way or another (preferably between 400° C. and 650° C.) the temperature does not need to be increased any further, but rather just has to be maintained. In a second desulphurization phase II, which succeeds the first phase at the corresponding time $t_1$ and forms a relatively short transitional phase, therefore, the further energy supply is reduced to such an extent that the accumulator temperature remains within the optimum desulphurization range. For this purpose, on the one hand the secondary air quantity which is metered in is reduced by lowering the feed rate L from the value $L_1$ during the first desulphurization phase I to a lower value $L_2$, and on the other hand the engine air ratio $1_{M1}$ is raised from the previously substoichiometric value $1_{M1}$ to a slightly less substoichiometric value $1_{M2}$.

Changes to the secondary air feed rate L and engine air ratio _M are adapted to one another in such a way that the resultant accumulator air ratio _s remains in the rich range even in the second desulphurization phase II, i.e., remains unchanged at the level of the first desulphurization phase I. On account of the fall in both the reducing agent quantity emitted from the engine and the secondary air quantity metered in, which is brought about at the transition from the first to the second desulphurization phase, the fuel which has to be injected into the engine and the power consumption of a secondary air pump used to supply the secondary air are minimized, avoiding unnecessary energy consumption, and in addition the accumulator which is to be desulphurized is protected from overheating.

After the secondary air quantity and reducing agent quantity required to maintain the desired desulphurization temperature have been set in a stable manner, at a corresponding time $t_2$ a transition takes place from the second desulphurization phase to a third desulphurization phase III, in which the accumulator air ratio _s, as shown, oscillates repeatedly between an oxidizing atmosphere and a reducing atmosphere. That is, it is set, for example in the form of square-wave pulses, to alternate between levels of greater than 1, (i.e., superstoichiometric or lean levels), and levels less than 1, (i.e., substoichiometric or rich levels). In the example shown, relatively short intervals with an accumulator air ratio _s which is at a superstoichiometric level _s1 alternate with somewhat longer intervals in which the accumulator air ratio _s is at a substoichiometric level _s2. Overall, the interval lengths and accumulator air ratios _s1, _S2 are adapted to one another in such a way that the accumulator air ratio _s on average remains in the rich range, preferably at a level which is slightly lower than one.

In the example shown, the oscillating modulation of the accumulator air ratio _s is brought about by a corresponding oscillating change in the engine air ratio between two engine air ratio values _M3, _M4, which both lie in the rich range and of which one lies below and the other above the engine air ratio value _M2 during the previous, second desulphurization phase II. At the same time, the secondary air feed rate $L_2$ which was set for the second desulphurization phase II is maintained for the third desulphurization phase III.

In the example shown the modulation of the accumulator air ratio _S in the third desulphurization phase III is achieved only by corresponding modulation of the engine air ratio _M while the secondary air feed rate L is kept constant. However, as an alternative the desired oscillating change in the accumulator air ratio _s can be set by corresponding modulation of the secondary air feed rate L alone, while the engine air ratio _M is kept constant, or by simultaneous, mutually adapted modulation of both the engine air ratio _M and the secondary air feed rate L. The secondary air quantity which is metered in each case determines the quantity of oxygen which is available in the accumulator which is to be desulphurized, while the engine air ratio sets the reducing agent quantity which is available in the accumulator.

The setting of the oscillating accumulator air ratio $1_s$ during the third desulphurization phase III preferably takes place in the form of a regulation system with a predetermined correspondingly oscillating desired value. In this case, to monitor the actual value of the accumulator air ratio $1_s$, a lambda probe is positioned upstream or downstream of the $NO_x$ or $SO_x$ accumulator, and the output signal from this probe is used to adjust the engine air ratio $1_M$ and/or the secondary air feed rate L in such a way that the desired oscillating profile of the accumulator air ratio $1_s$ is produced.

It has been found that providing successive intervals with an oxidizing atmosphere and a reducing atmosphere allows very effective desulphurization to be achieved in the $NO_x$ or $SO_x$ accumulator. In periods with a rich accumulator air ratio, i.e. a reducing atmosphere, deposited sulphates are broken down, preferably under the catalytic action of a precious metal catalyst material used for the accumulator body. During this sulphate decomposition, sulfides are formed, which begin to cover the precious metal material so that there is a risk of a reduction in the catalytic activity thereof. Before the precious metal material is noticeably poisoned in this way by the sulfides formed, so that its catalytic action begins to drop, the process is switched to an interval with an oxidizing or stoichiometric atmosphere (i.e., with a superstoichiometric or stoichiometric accumulator air ratio). This utilizes the discovery that the sulfides which have previously been formed can easily be oxidized to form $SO_2$ by the oxygen which is now present, possibly in excess, and can be discharged from the accumulator in this form. As a result, the sulfides formed can be cleaned off the precious metal material, with $SO_2$ being released, before the sulphate decomposition rate decreases considerably. Then, the process is set back to an interval with a reducing atmosphere, in order to continue the decomposition of sulphates.

This procedure can be used to effect relatively rapid cleaning of deposited sulphates from the $NO_x$ or $SO_x$ accumulator. The oscillating change in the accumulator air ratio _s between an oxidizing or stoichiometric atmosphere and a reducing atmosphere is continued until the sulphates which have been deposited in the accumulator have been desorbed and broken down to a sufficient extent, so that the storage capacity of the $NO_x$ or $SO_x$ accumulator for nitrogen oxides or sulphur oxides, respectively, is sufficiently great again. The third desulphurization phase III and therefore the desulphurization process as a whole is then ended at the appropriate time $t_3$, for which purpose, in the example shown, the engine air ratio _M is set back to the stoichiometric level of one and the secondary air supply is terminated.

It will be understood that during the oscillating modulation of the accumulator air ratio $1_s$ in the third desulphurization phase III, the amplitude (i.e., the difference between the at least stoichiometric accumulator air ratio value $1_s$ and the substoichiometric value $1_{s2}$) and/or the frequency (i.e., the regularity with which there is a Switch between an oxidizing or stoichiometric atmosphere), on the one hand, and a reducing atmosphere, on the other hand,) can be adapted to the conditions required for sulphate decomposition to be as rapid as possible and in this case, in particular, can be set as a function of the operating state of the system, specifically both within a desulphurization process and also between different desulphurization processes which are carried out periodically.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for periodic desulphurization of a nitrogen-oxide or sulphur-oxide accumulator of an exhaust-gas cleaning system of an internal-combustion engine, wherein:

during a desulphurization period which occurs after a predeterminable desulphurization temperature has been reached, the accumulator is fed secondary air by a secondary-air supply, and is fed an engine exhaust gas which contains a reducing agent by setting a rich engine air ratio; and during at least part of the desulphurization period, an accumulator air ratio is set, by suitably alternating at least one of the secondary air quantity and an engine air ratio, between an oxidizing or stoichiometric atmosphere, on the one hand, and a reducing atmosphere, on the other hand.

2. The method according to claim 1, wherein at least one of amplitude and frequency of oscillations of the accumulator air ratio between an oxidizing or stoichiometric atmosphere and a reducing atmosphere is set variably according to operating conditions.

3. The method according to claim 1, wherein the accumulator air ratio is recorded by means of a lambda probe positioned upstream or downstream of the nitrogen-oxide or sulphur-oxide accumulator, and is set to a desired value which oscillates between an oxidizing or stoichiometric atmosphere, on the one hand, and a reducing atmosphere, on the other hand.

4. The method according to claim 1, wherein during an initial accumulator heating phase of a particular desulphurization period, the accumulator air ratio is kept constantly in the rich range, and in the process a rich engine air ratio is set and secondary air is supplied.

5. A method for periodic desulphurization of a nitrogen oxide or sulfur oxide accumulator in an exhaust gas cleaning system for an internal combustion engine, said method comprising:

heating said accumulator to a predeterminable desulphurization temperature;

during a desulphurization period, which occurs after the accumulator has reached said desulphurization temperature, controlling operating parameters of said engine and said exhaust gas cleaning system such that an accumulator air ratio of exhaust gas in said accumulator is set to oscillate between an oxidizing or stoichiometric atmosphere, and a reducing atmosphere.

6. The method according to claim 5, wherein said step of controlling said operating parameters comprises:

modulating at least one of an engine air ratio and a secondary air quantity input fed to said accumulator; and coordinatig said engine air ratio and said e=secondary air quantity to achieve said oscillation of said accumulator air ratio.

7. The method according to claim 5, wherein aid accumulator air ratio remains on average in a rich range during said desulphurization period.

8. The method according to claim 7, wherein said air ratio is maintained in such rich range on average, by adjusting relative durations of lean and rich phases of said oscillation.

* * * * *